US011094959B2

(12) United States Patent
Umeyama et al.

(10) Patent No.: US 11,094,959 B2
(45) Date of Patent: Aug. 17, 2021

(54) METHOD OF MANUFACTURING SECONDARY BATTERY

(71) Applicant: TOYOTA JIDOSHA KABUSHIKI KAISHA, Toyota (JP)

(72) Inventors: Hiroya Umeyama, Okazaki (JP); Ichiro Murata, Settsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 651 days.

(21) Appl. No.: 15/260,514

(22) Filed: Sep. 9, 2016

(65) Prior Publication Data

US 2017/0077543 A1 Mar. 16, 2017

(30) Foreign Application Priority Data

Sep. 11, 2015 (JP) .............................. JP2015-179961

(51) Int. Cl.
| | | |
|---|---|---|
| *H01M 10/04* | (2006.01) | |
| *H01M 2/02* | (2006.01) | |
| *H01M 2/04* | (2006.01) | |
| *B23K 26/20* | (2014.01) | |
| *B23K 26/06* | (2014.01) | |
| *B23K 26/082* | (2014.01) | |

(Continued)

(52) U.S. Cl.
CPC ......... *H01M 10/04* (2013.01); *B23K 26/0608* (2013.01); *B23K 26/082* (2015.10); *B23K 26/206* (2013.01); *H01M 50/116* (2021.01); *H01M 50/155* (2021.01); *H01M 50/166* (2021.01); *H01M 50/169* (2021.01); *B23K 2101/36* (2018.08); *H01M 50/103* (2021.01); *H01M 50/15* (2021.01)

(58) Field of Classification Search
CPC ............ B23K 2101/36; B23K 2201/36; B23K 26/206; B23K 26/26; B23K 26/24; B23K 26/28; B23K 26/0608; H01M 10/04; H01M 2/0217; H01M 2/0257; H01M 2/0285; H01M 2/0426; H01M 2/0439; H01M 2/0473; H01M 2/0486; H01M 2/04–0495; H01M 50/169
USPC .................................................. 429/163, 175
See application file for complete search history.

(56) References Cited

U.S. PATENT DOCUMENTS

| | | | | |
|---|---|---|---|---|
| 6,174,620 B1 * | 1/2001 | Okada | ................. | H01M 2/0202 429/176 |
| 2003/0059677 A1 * | 3/2003 | Shinohara | ........... | H01M 2/0426 429/174 |

(Continued)

FOREIGN PATENT DOCUMENTS

| | | |
|---|---|---|
| JP | 7-272701 A | 10/1995 |
| JP | 2001-351582 A | 12/2001 |

(Continued)

*Primary Examiner* — Justin C Dodson
(74) *Attorney, Agent, or Firm* — Sughrue Mion, PLLC

(57) ABSTRACT

A method of manufacturing a secondary battery is provided. According to the manufacturing method, laser light includes first peak light applied to a first irradiation position located on a cover body, second peak light applied to a second irradiation position located between the first irradiation position and a connecting surface, and third peak light applied to the connecting surface. The first peak light is higher in intensity than the second peak light and the third peak light. The third peak light is higher in intensity than the second peak light.

2 Claims, 10 Drawing Sheets

(51) Int. Cl.
  *H01M 50/116* (2021.01)
  *H01M 50/155* (2021.01)
  *H01M 50/166* (2021.01)
  *H01M 50/169* (2021.01)
  *B23K 101/36* (2006.01)
  *H01M 50/15* (2021.01)
  *H01M 50/103* (2021.01)

(56) References Cited

U.S. PATENT DOCUMENTS

| | | | | |
|---|---|---|---|---|
| 2006/0240320 | A1* | 10/2006 | Cheon | H01M 2/08 |
| | | | | 429/175 |
| 2014/0342198 | A1* | 11/2014 | Kim | H01M 2/0473 |
| | | | | 429/56 |
| 2015/0303441 | A1* | 10/2015 | Takagi | H01M 2/22 |
| | | | | 429/61 |
| 2015/0372261 | A1 | 12/2015 | Suzuki et al. | |
| 2016/0035530 | A1* | 2/2016 | Seong | H01J 9/20 |
| | | | | 445/25 |
| 2016/0155998 | A1* | 6/2016 | Wakimoto | H01M 2/0237 |
| | | | | 429/94 |

FOREIGN PATENT DOCUMENTS

| | | | |
|---|---|---|---|
| JP | 2013220462 | * | 10/2013 |
| JP | 2014-10887 A | | 1/2014 |
| JP | 2015-111573 A | | 6/2015 |
| JP | 2015-125886 A | | 7/2015 |

* cited by examiner

METHOD OF MANUFACTURING SECONDARY BATTERY

This nonprovisional application is based on Japanese Patent Application No. 2015-179961 filed on Sep. 11, 2015, with the Japan Patent Office, the entire contents of which are hereby incorporated by reference.

BACKGROUND OF THE INVENTION

Field of the Invention

The disclosure relates to a method of manufacturing a secondary battery.

Description of the Background Art

Lithium-ion secondary batteries and the like include an electrode body and a battery case that houses the electrode body. For example, as disclosed in Japanese Patent Laying-Open No. 2001-351582 and the like, a method of manufacturing such a secondary battery includes a step of fitting a cover body in a case body provided with an opening, and laser-welding a portion at which the cover body and the case body are butted against each other.

When the cover body and the housing case are laser-welded, a plume is generated from the position to which laser light is applied. Plumes are high-temperature metal vapor and plasma. Thus, depending on how welding is performed, such plumes may exert a thermal effect upon a resin member provided in the cover body.

Accordingly, various kinds of methods of manufacturing a secondary battery have been proposed for the purpose of suppressing an influence caused by the plume generated during laser welding from being exerted upon the resin member provided in the cover body.

For example, Japanese Patent Laying-Open No. 2014-10887 discloses a method of performing laser welding while introducing shield gas into a concave-shaped space that is formed around an insulation member provided in a battery case cover.

Furthermore, Japanese Patent Laying-Open No. 2015-111573 discloses a method of applying laser light of high energy to a section on the longer side of a cover member that faces at least an insulation member, and applying laser light of low energy to sections other than the above-mentioned section. In the section to which laser light of high energy is applied, weld scars are formed on the outside surface of the cover member and also on the open end face and the outside surface of a battery case main body.

SUMMARY OF THE INVENTION

However, according to the method disclosed in Japanese Patent Laying-Open No. 2014-10887, the concave portion formed in the battery case cover extends in an elongated manner along the outer periphery of the insulation member. Accordingly, the shield gas is more likely to diffuse in the downstream area of the concave portion, which makes it difficult to accurately control shaking of the plume.

In the method disclosed in Japanese Patent Laying-Open No. 2015-111573, laser light of high energy is applied to a section facing the insulation member. When laser light of high energy is applied, a large quantity of plumes is generated, so that the thermal effect to be exerted upon the insulation member may be increased in some cases.

The disclosure has been made in light of the above-described problems. An object of the disclosure is to provide a method of manufacturing a secondary battery, which can suppress an influence caused by plumes generated during laser-welding of a cover body and a case body from being exerted upon a resin member and the like provided on an upper surface of the cover body.

A method of manufacturing a secondary battery according to the disclosure includes: preparing a case body provided with an opening; disposing a cover body in the opening; applying laser light to an opening edge of the case body and an outer peripheral edge of the cover body to weld the outer peripheral edge of the cover body and the opening edge of the case body.

The case body includes a bottom plate portion and a peripheral wall portion that is connected to an outer peripheral edge of the bottom plate portion, the peripheral wall portion standing upright. The peripheral wall portion includes an outer peripheral surface, an upper surface annularly extending so as to provide the opening, and a connecting surface connecting the outer peripheral surface and the upper surface. The connecting surface is formed so as to extend downward from the upper surface toward the outer peripheral surface. The laser light includes first peak light applied to a first irradiation position located on the cover body, second peak light applied to a second irradiation position located between the first irradiation position and the connecting surface, and third peak light applied to the connecting surface. The first peak light is higher in intensity than the second peak light and the third peak light. The third peak light is higher in intensity than the second peak light.

According to the above-described method of manufacturing a secondary battery, the plume discharged from the weld portion during welding is inclined to the outside. Accordingly, the members such as an insulator provided on the upper surface of the cover body can be suppressed from being significantly influenced by the plume.

The connecting surface is an inclined surface. The inclined surface is inclined at an angle of 15 degrees or more and 45 degrees or less with respect to a virtual flat plane along a virtual line extending linearly from the upper surface of the case body to an outside of the case body.

By setting the inclination angle of the inclined surface as described above, thermal effects can be suppressed from being exerted upon the members such as an insulator provided on the upper surface of the cover body, and also, an excellent weld portion can be formed.

The foregoing and other objects, features, aspects and advantages of the disclosure will become more apparent from the following detailed description of the disclosure when taken in conjunction with the accompanying drawings.

DESCRIPTION OF THE PREFERRED EMBODIMENTS

Figure 1:
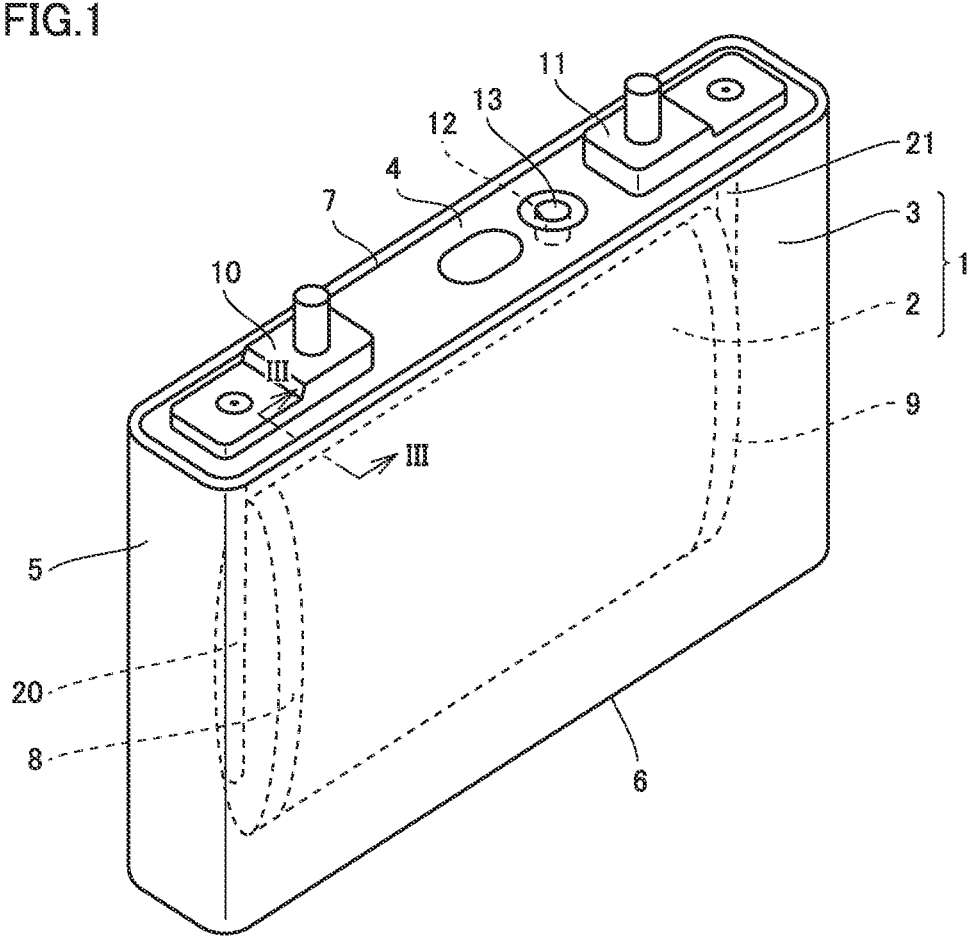
FIG. 1 is a perspective view showing a secondary battery 1 according to the present embodiment.

Referring to FIG. 1 and the like, a secondary battery 1 and a method of manufacturing secondary battery 1 according to the present embodiment will be hereinafter described.

FIG. 1 is a perspective view showing a secondary battery 1 according to the present embodiment. As shown in this FIG. 1, secondary battery 1 includes an electrode body 2 and a battery case 3 that houses electrode body 2. Electrode body 2 is formed by winding a stack obtained by sequentially overlaying a positive electrode sheet onto which a positive electrode active material and the like are applied, a separator, a negative electrode sheet onto which a negative electrode active material and the like are applied, and a separator.

Electrode body 2 includes a positive electrode portion 8 formed at one end of electrode body 2 and a negative electrode portion 9 formed at the other end of electrode body 2. Secondary battery 1 includes a positive electrode collector 20 connected to positive electrode portion 8, and a negative electrode collector 21 connected to negative electrode portion 9.

Battery case 3 includes: a bottom plate portion 6; a peripheral wall portion 5 extending upward from the outer peripheral edge of bottom plate portion 6; a top plate portion 4 disposed on the upper end portion side of peripheral wall portion 5; and a weld portion 7 connecting top plate portion 4 and peripheral wall portion 5.

Battery case 3 includes a positive terminal 10 provided on the upper surface of top plate portion 4, a negative terminal 11 disposed at a distance from positive terminal 10, and a sealing member 13 sealing an inlet 12 formed in top plate portion 4.

Figure 2:
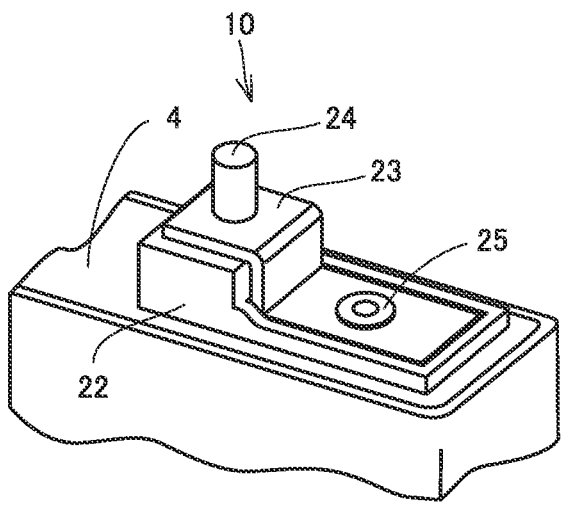
FIG. 2 is a perspective view showing a positive terminal 10.

FIG. 2 is a perspective view showing positive terminal 10. As shown in FIG. 2, positive terminal 10 includes an insulator 22 provided on the upper surface of top plate portion 4, a metal piece 23 disposed on the upper surface of insulator 22, a terminal 24 provided at one end of metal piece 23, and a joint portion 25 provided at the other end of metal piece 23. Positive electrode collector 20 is joined to this joint portion 25. Insulator 22 is formed with resin or the like.

Figure 3:
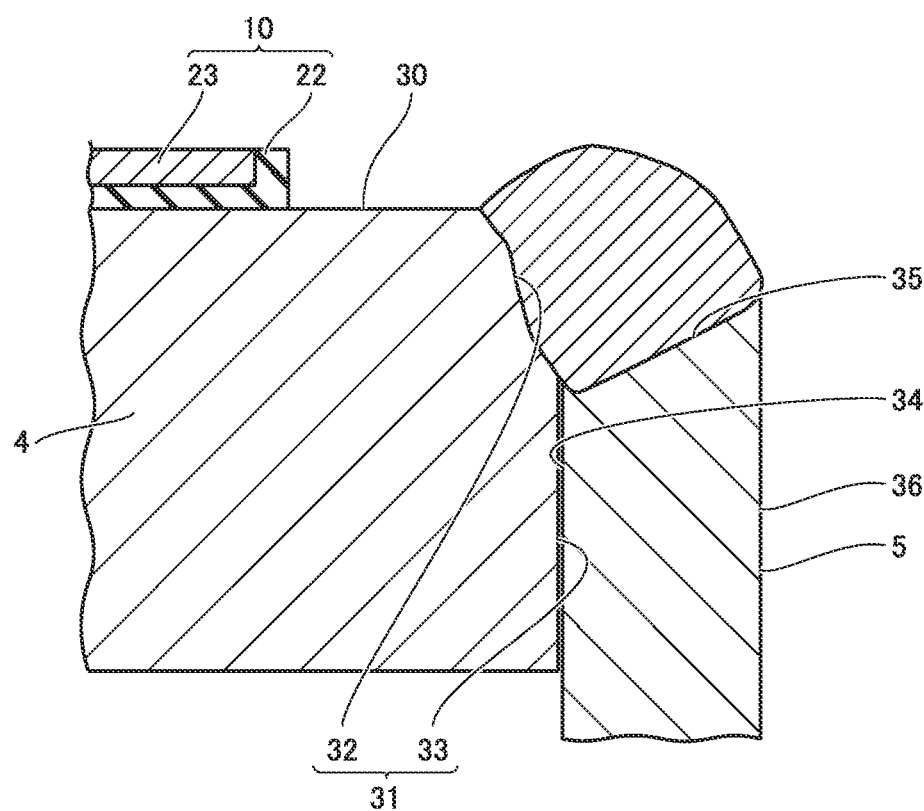
FIG. 3 is a cross-sectional view taken along a line in FIG. 1.

FIG. 3 is a cross-sectional view taken along a line in FIG. 1. As shown in FIG. 3, top plate portion 4 includes an upper surface 30 and an outer peripheral surface 31 connected to upper surface 30. Outer peripheral surface 31 includes a boundary surface 32 curved along the shape of weld portion 7, and a facing surface 33 connected to the lower end of boundary surface 32 and facing peripheral wall portion 5. Peripheral wall portion 5 includes an inner peripheral surface 34, an upper surface 35 extending along the shape of weld portion 7, and an outer peripheral surface 36 connected to the outer peripheral edge of upper surface 35.

Figure 4:
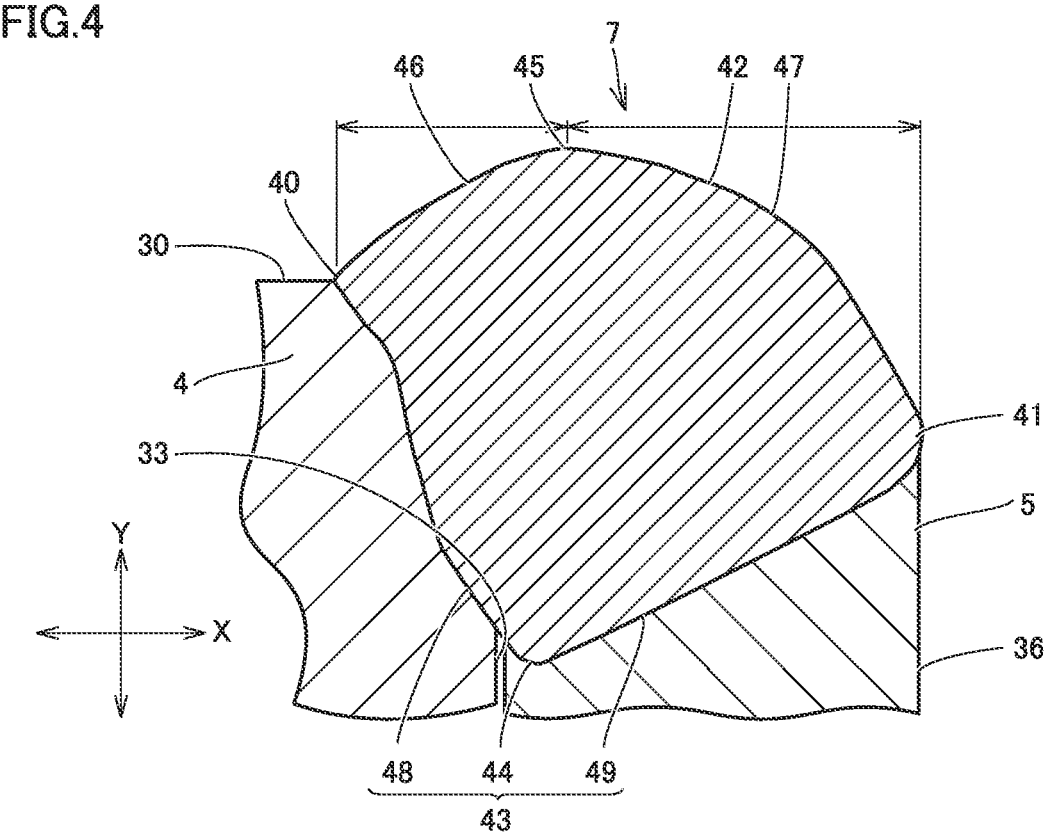
FIG. 4 is a cross-sectional view showing the configuration of a weld portion 7 and its surrounding area.

FIG. 4 is a cross-sectional view showing the configuration of weld portion 7 and its surrounding area. FIGS. 3 and 4 mentioned above each show a cross-sectional view taken in the perpendicular direction with respect to the direction in which weld portion 7 extends. As shown in this FIG. 4, weld portion 7 includes an inner peripheral edge 40 located on the upper surface 30 side of top plate portion 4, and an outer peripheral edge 41 located on the outer peripheral surface 36 side of peripheral wall portion 5. Inner peripheral edge 40 is located closer to facing surface 33 than outer peripheral edge 41 in a width direction X. Also, inner peripheral edge 40 is located higher than outer peripheral edge 41 in an up-and-down direction Y.

Weld portion 7 includes: an upper surface 42 formed so as to bulge upward and connecting inner peripheral edge 40 and outer peripheral edge 41; and a lower surface 43 formed so as to protrude downward and connecting inner peripheral edge 40 and outer peripheral edge 41.

Upper surface 42 includes a vertex portion 45 located at the highest position in up-and-down direction Y, a curved surface 46 formed so as to extend upward from inner peripheral edge 40 toward vertex portion 45, and a curved surface 47 formed so as to extend upward from outer peripheral edge 41 toward vertex portion 45.

Vertex portion 45 is located closer to facing surface 33 than inner peripheral edge 40 and outer peripheral edge 41 in width direction X. Also, vertex portion 45 is located at facing surface 33 or in the vicinity of facing surface 33.

Lower surface 43 includes a vertex portion 44 located at the lowest position in up-and-down direction Y, an inclined surface 48 extending from inner peripheral edge 40 toward vertex portion 44, and an inclined surface 49 extending from outer peripheral edge 41 toward vertex portion 44. Inclined surface 48 is formed so as to extend downward from inner peripheral edge 40 toward vertex portion 44. Inclined surface 49 is formed so as to extend downward from outer peripheral edge 41 toward vertex portion 44.

In this case, inner peripheral edge 40 is closer to vertex portion 44 than outer peripheral edge 41 in width direction X, and is farther away from vertex portion 44 than outer peripheral edge 41 in up-and-down direction Y. Accordingly, the difference between the distance from inner peripheral edge 40 to vertex portion 44 and the distance from outer peripheral edge 41 to vertex portion 44 is small. In addition, vertex portion 45 is located above vertex portion 44 or located above the area in the vicinity of vertex portion 44.

A portion of weld portion 7 formed as described above that is thickest in up-and-down direction Y is located at facing surface 33 and in the vicinity thereof.

Accordingly, even if the welding strength of weld portion 7 welding top plate portion 4 and peripheral wall portion 5 is so high that external force is applied to top plate portion 4 or peripheral wall portion 5, occurrence of cracking or the like in weld portion 7 can be suppressed.

Furthermore, since inner peripheral edge 40 is closer to facing surface 33 than outer peripheral edge 41 in width direction X, area reduction in upper surface 30 is suppressed, thereby widely ensuring the space in which various kinds of members are arranged on the upper surface of top plate portion 4.

In addition, inner peripheral edge 40 is located close to facing surface 33 in width direction X and located higher than outer peripheral edge 41. Accordingly, the area of inclined surface 48 is ensured. Thus, even if external force is applied to top plate portion 4 and the like, peeling off of top plate portion 4 from weld portion 7 is suppressed.

Furthermore, curved surface 47 of upper surface 42 is formed to extend upward from outer peripheral edge 41 toward inner peripheral edge 40 in such a manner that weld portion 7 does not bulge from outer peripheral surface 36 to the outside. Accordingly, when a battery unit is configured in such a manner that a plurality of secondary batteries 1 are arranged so as to contact with each other, deterioration in dimensional accuracy of the battery unit can be suppressed.

Figure 5:
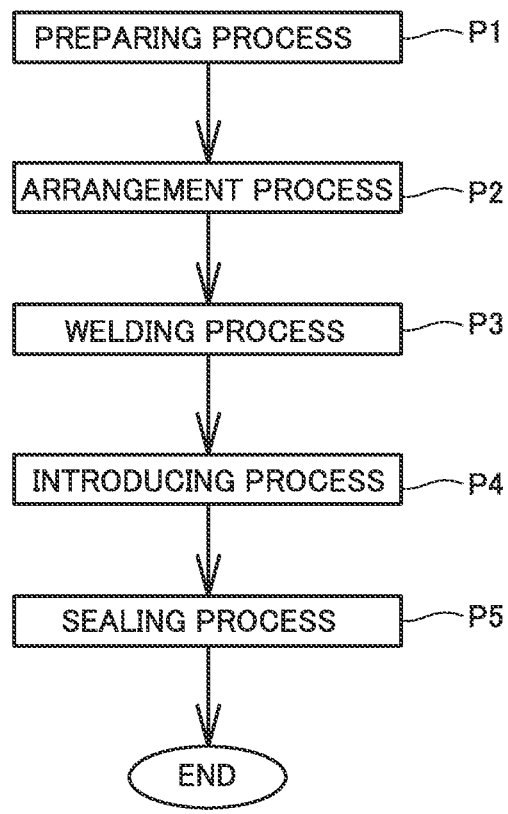
FIG. 5 is a flow diagram showing a flow of manufacturing secondary battery 1.

The method of manufacturing secondary battery 1 configured as described above will be hereinafter described. FIG. 5 is a flow diagram showing a flow of manufacturing secondary battery 1. As shown in this FIG. 5, the process of manufacturing secondary battery 1 includes a preparing process P1, an arrangement process P2, a welding process P3, an introducing process P4, and a sealing process P5.

Figure 6:
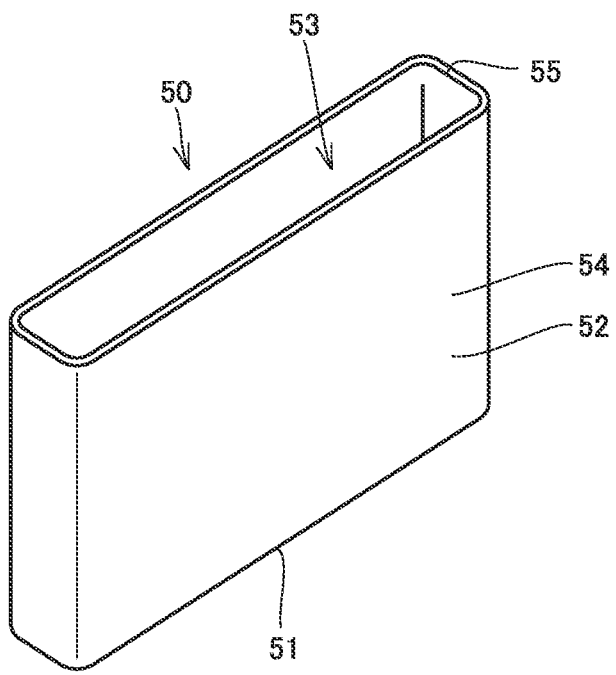
FIG. 6 is a perspective view showing a process of preparing a case body 50.

Preparing process P1 includes a process of preparing case body 50, a process of preparing a cover body, and a process of connecting an electrode body to the cover body. FIG. 6 is a perspective view showing the process of preparing case body 50. Case body 50 is prepared as shown in this FIG. 6. Case body 50 includes a bottom plate portion 51 and a peripheral wall portion 52 that is formed so as to stand upright from the outer peripheral edge of bottom plate portion 51. Case body 50 is formed to be hollow and provided with an opening 53.

Figure 7:
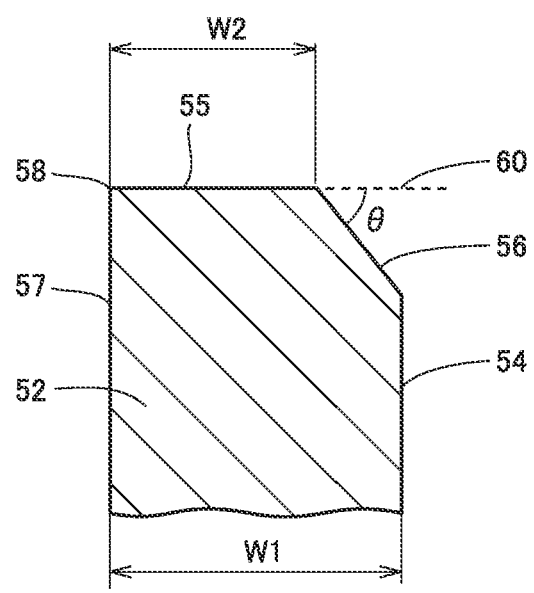
FIG. 7 is a cross-sectional view showing a part of an outer peripheral surface 54.

FIG. 7 is a cross-sectional view showing a part of peripheral wall portion 52. As shown in FIG. 7, peripheral wall portion 52 includes an outer peripheral surface 54, an upper surface 55 located higher than outer peripheral surface 54, an inclined surface 56 connecting upper surface 55 and outer peripheral surface 54, and an inner peripheral surface 57 connected to the inner peripheral edge of upper surface 55. Upper surface 55 extends annularly so as to form opening 53. In addition, upper surface 55 and inner peripheral surface 57 form an opening edge 58 at opening 53.

Upper surface 55 is formed in a planar shape. Assuming that the flat plane along a virtual line linearly extending from upper surface 55 to the outside of case body 50 is defined as a virtual plane 60 and that the intersecting angle between virtual plane 60 and inclined surface 56 is defined as an intersecting angle θ, intersecting angle θ is 15 degrees or more and 45 degrees or less.

Peripheral wall portion 52 has a width W1 of about 0.4 mm, for example. Upper surface 55 has a width W2 of 0.1 mm or more (width W1—0.1 mm). When width W1 is 0.4 mm, width W2 of upper surface 55 is 0.1 mm or more and 0.3 mm or less. Case body 50 is formed of an aluminum alloy, for example.

Figure 8:
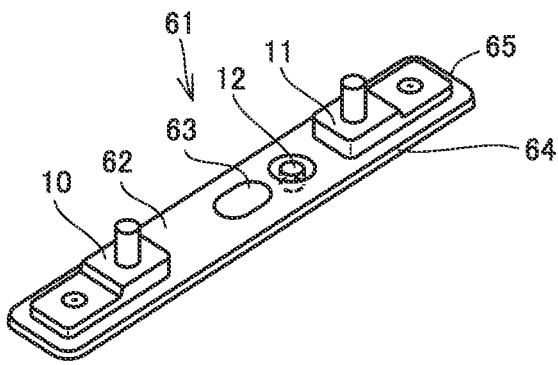
FIG. 8 is a perspective view showing a process of preparing a cover body 61 in a preparing process P1.

FIG. 8 is a perspective view showing the process of preparing a cover body 61 in preparing process P1. As shown in this FIG. 8, cover body 61 includes a metal plate 62, and a positive terminal 10 and a negative terminal 11 that are provided on the upper surface of metal plate 62. Metal plate 62 is provided with an inlet 12. In preparing process P1, sealing member 13 is not provided at inlet 12.

Cover body 61 includes an upper surface 63 and an outer peripheral surface 64 that is connected to upper surface 63. Outer peripheral surface 64 and upper surface 63 form an outer peripheral edge 65 that extends annularly.

Figure 9:
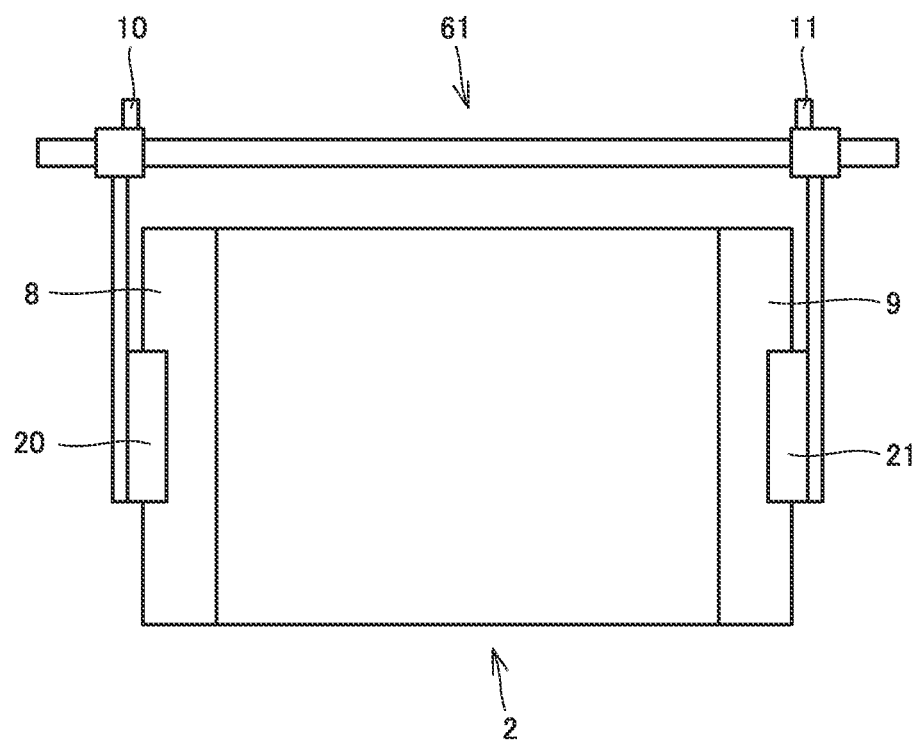
FIG. 9 is a schematic diagram schematically showing a process of connecting an electrode body 2 and cover body 61 in preparing process P1.

FIG. 9 is a schematic diagram schematically showing the process of connecting electrode body 2 and cover body 61 in preparing process P1. As shown in FIG. 9, negative electrode portion 9 and negative terminal 11 in electrode body 2 are connected by negative electrode collector 21 while positive electrode portion 8 and positive terminal 10 in electrode body 2 are connected by positive electrode collector 20.

Figure 10:
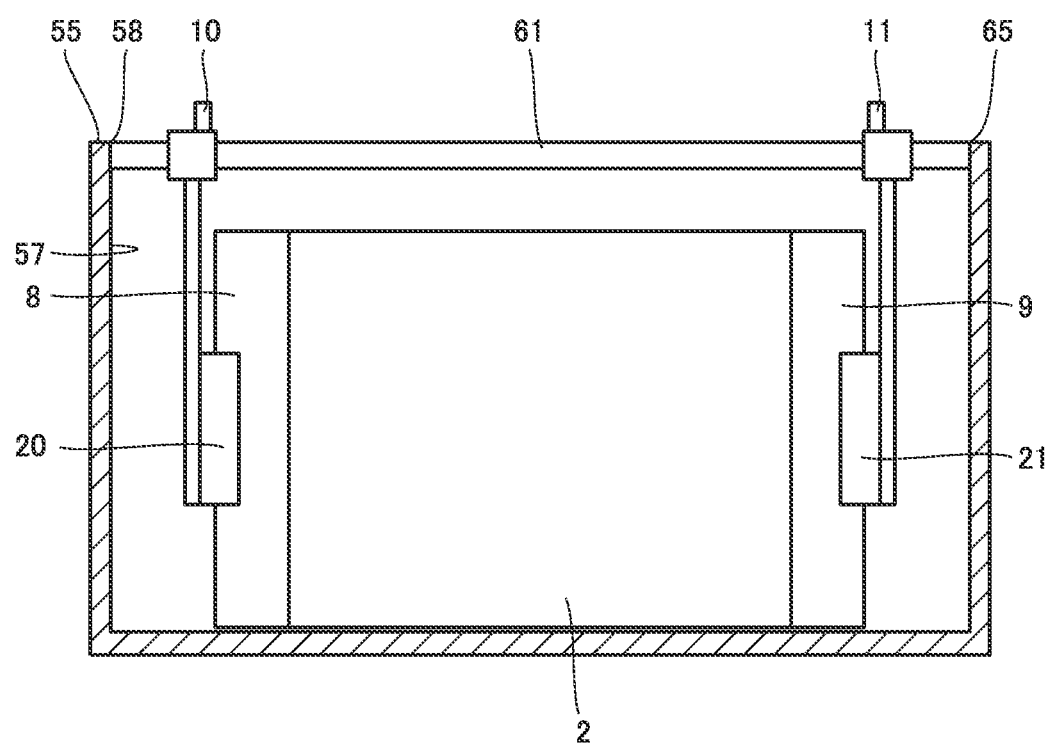
FIG. 10 is a schematic diagram schematically showing an arrangement process P2.

FIG. 10 is a schematic diagram schematically showing arrangement process P2. As shown in FIG. 10, cover body 61 having electrode body 2 connected thereto is disposed within opening 53 of case body 50. In this case, outer peripheral edge 65 of cover body 61 and opening edge 58 of case body 50 are arranged to face each other.

Figure 11:
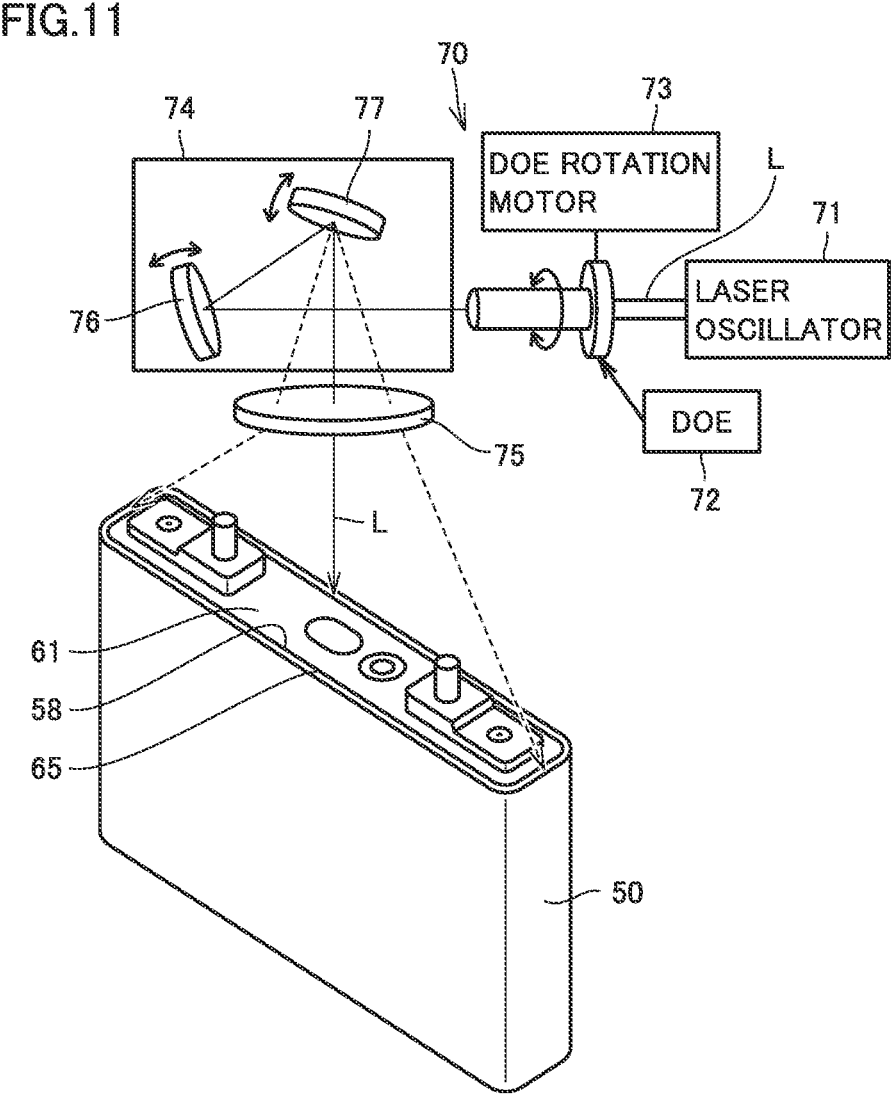
FIG. 11 is a schematic diagram schematically showing a welding process P3.

FIG. 11 is a schematic diagram schematically showing welding process P3. As shown in FIGS. 10 and 11, in the state where cover body 61 is fitted in the opening of case body 50, laser light L emitted from a laser beam welding apparatus 70 is applied to outer peripheral edge 65 of cover body 61 and opening edge 58 of case body 50.

Laser beam welding apparatus 70 is a galvano scanner-type welding apparatus. This laser beam welding apparatus 70 includes a laser oscillator 71, a diffraction optical element 72, a rotation motor 73, a galvano scanner 74, and an fθ lens 75. Galvano scanner 74 includes a reflecting mirror 76 and a reflecting mirror 77.

Laser oscillator 71 generates laser light, which enters diffraction optical element 72 through an optical fiber, and then enters galvano scanner 74.

The laser light having entered galvano scanner 74 is reflected from reflecting mirror 76 and reflecting mirror 77, and then, the reflected laser light enters fθ lens 75. The laser light emitted from fθ lens 75 is concentrated into a prescribed focusing position.

In such laser beam welding apparatus 70, the irradiation position of laser light L can be adjusted by adjusting reflecting mirror 76 and reflecting mirror 77. Furthermore, the focusing position of laser light L can be adjusted by adjusting fθ lens 75.

Figure 12:
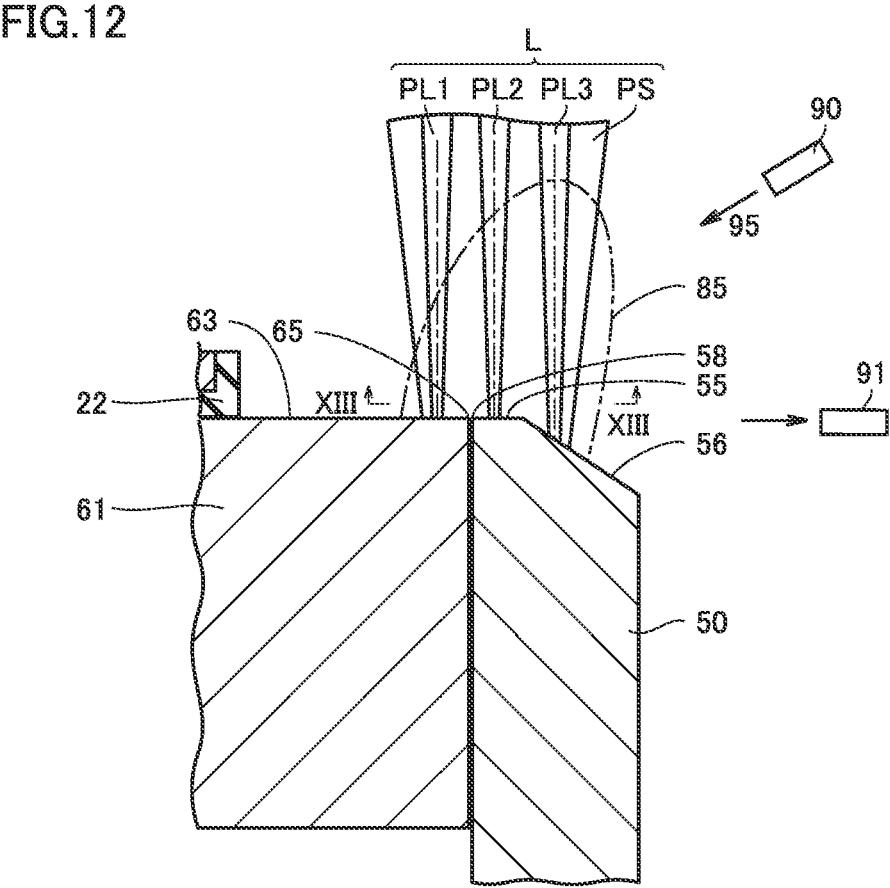
FIG. 12 is a cross-sectional view showing the manner in which laser light L is applied from above cover body 61 onto an outer peripheral edge 65 of cover body 61 and an opening edge 58 of case body 50 after a cover body 61 is fitted in case body 50.

FIG. 12 is a cross-sectional view showing the manner in which laser light L is applied from above cover body 61 onto outer peripheral edge 65 of cover body 61 and opening edge 58 of case body 50 after cover body 61 is fitted in case body 50. During welding, in order to suppress oxidation of molten metal, shield gas is supplied from a nozzle 90 and discharged through a vacuum 91. Shield gas 95 is fed at an extremely slow rate, which hardly exerts an influence upon the rising direction of the plume, as will be described later.

Figure 13:
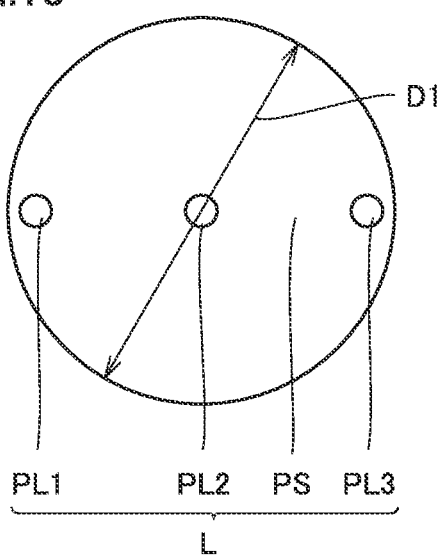
FIG. 13 is a cross-sectional view taken along a line XIII-XIII in FIG. 11.

FIG. 13 is a cross-sectional view taken along a line XIII-XIII in FIG. 12. As shown in FIGS. 12 and 13, laser light L includes ambient light PS, and peak light PL1, peak light PL2 and peak light PL3 that are located within ambient light PS.

In FIG. 13, ambient light PS has a circular cross-sectional shape and has a diameter D1 of about 0.45 mm, for example. Each of peak light PL1, peak light PL2, and peak light PL3 also has a circular cross-sectional shape and has a diameter of about 40 μm.

Peak light PL2 is located at the center of ambient light PS. Peak light PL1, peak light PL2, and peak light PL3 are arranged in the radial direction of ambient light PS. Also, peak light PL1, peak light PL2, and peak light PL3 are sequentially arranged at regular intervals.

In addition, the distance between peak light PL1 and peak light PL2 and the distance between peak light PL2 and peak light PL3 are 0.2 mm, for example.

In this case, for example, the output of laser light L (the total output of ambient light PS, peak light PL1, peak light PL2, and peak light PL3) is 1200 W or more and 1800 W or less.

Each of peak light PL1, peak light PL2, and peak light PL3 is much higher in laser intensity than ambient light PS. Peak light PL1 is higher in laser intensity than peak light PL2 and peak light PL3. Peak light PL3 is higher in laser intensity than peak light PL2.

For example, assuming that the laser intensity of peak light PL3 is 1.0, the laser intensity of peak light PL1 is 1.2, and the laser intensity of peak light PL2 is 0.8. It is to be noted that the above-mentioned values of the intensity ratios are merely by way of example and not limited thereto.

In addition, the power density of each of peak light PL1, peak light PL2, and peak light PL3 is approximately 1 E+07 (W/cm$^2$), for example.

In FIG. 12, laser light L is applied to outer peripheral edge 65 of cover body 61 and opening edge 58. Specifically, ambient light PS is set so as to travel from upper surface 63 through outer peripheral edge 65 and opening edge 58 to inclined surface 56.

The irradiation position of peak light PL1 is located at upper surface 63 of cover body 61. The irradiation position of peak light PL2 is located at upper surface 55. The irradiation position of peak light PL3 is located at inclined surface 56.

While applying laser light L as described above, laser beam welding apparatus 70 causes the irradiation position of laser light L to be moved in the direction in which outer peripheral edge 65 and opening edge 58 extend. The scanning speed of laser light L is about 9 m/min or more and 24 m/min or less, for example.

In addition, the cross-sectional view shown in FIG. 12 is taken along the direction perpendicular to the direction in which outer peripheral edge 65 and opening edge 58 extend. As seen in cross section of this direction, the irradiation direction of each of peak light PL1, peak light PL2, and peak light PL3 is perpendicular or substantially perpendicular to upper surface 63.

Laser light L is applied as described above, thereby causing melting or the like of metal forming a cover body 61 and metal forming a case body 50, so that cover body 61 and case body 50 are welded.

Figure 14:
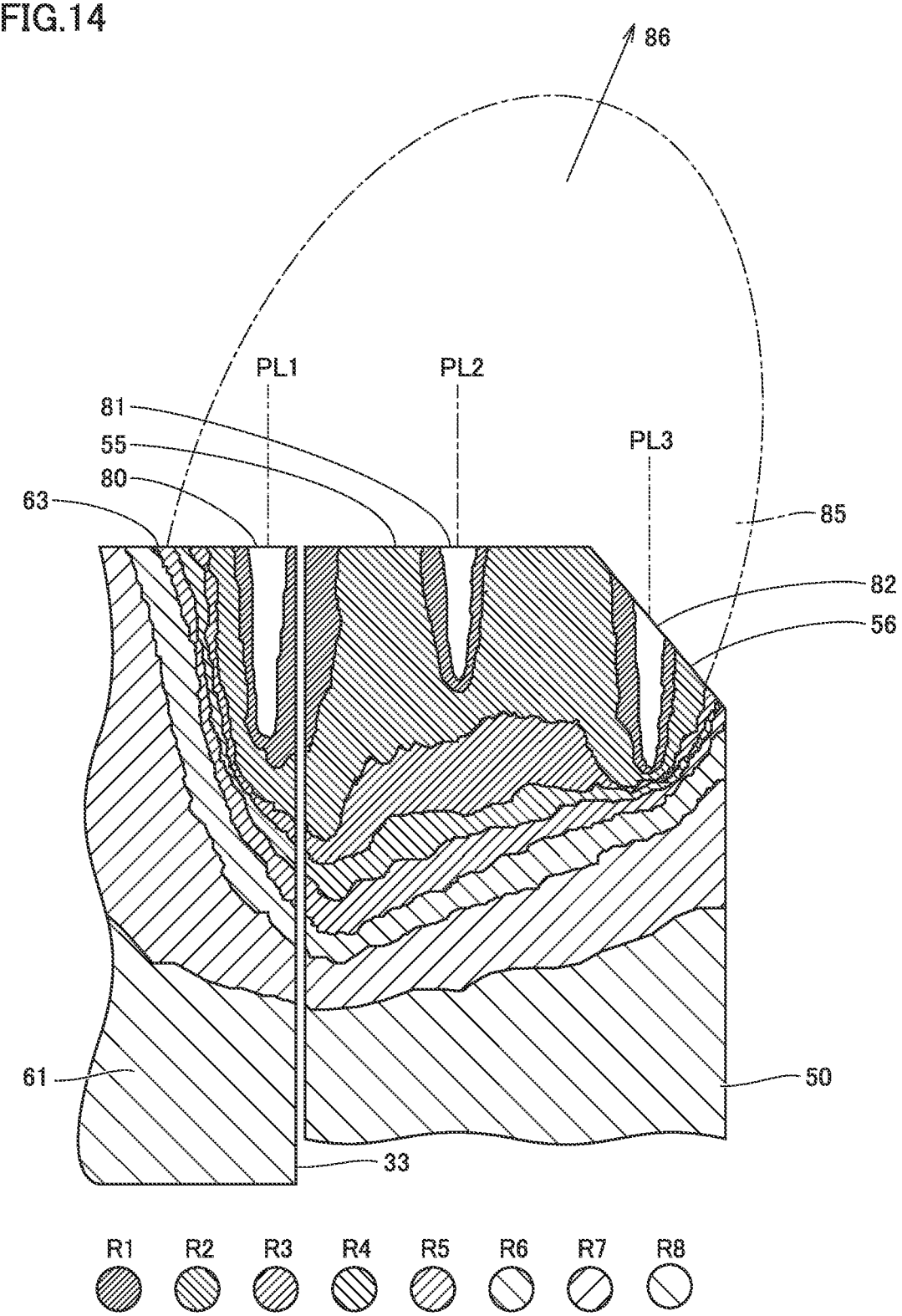
FIG. 14 is a schematic temperature distribution diagram schematically showing the temperature distribution during application of laser light L as shown in FIG. 12.

FIG. 14 is a schematic temperature distribution diagram schematically showing the temperature distribution during application of laser light L as shown in FIG. 12.

As shown in FIG. 14, when peak light PL1 is applied, the metal located at the irradiation position evaporates and the metal located in the area around the irradiation position melts. The evaporated gaseous metal is generally referred to as a plume. By the reaction force produced when this plume rises in the upward direction, a molten pool is recessed, thereby forming a keyhole 80. Similarly, peak light PL2 serves to form a keyhole 81 in upper surface 55, and peak light PL3 serves to form a keyhole 82 in inclined surface 56. The temperatures at the portions where keyholes 80, 81, and 82 are located are extremely high. In this FIG. 14, regions R1, R2, R3, R4, R5, R6, R7, and R8 exhibit roughly isothermal regions, in which the temperature gradually drops sequentially from region R1 toward region R8.

In FIG. 14, a large quantity of plumes are discharged from keyholes 80, 81, and 82 to the outside while plumes are discharged also from the molten pool formed around each of keyholes 80, 81 and 82 to the outside.

In this case, the plumes discharged from keyholes 80 and 81 and the plumes discharged from portions of the molten pools that are located in upper surface 63 and upper surface 55 are discharged upward in the approximately vertical direction.

On the other hand, the plume discharged from keyhole 82 is discharged through the opening in keyhole 82 in the direction perpendicular or approximately perpendicular to inclined surface 56.

Generally, it is understood that the plume is discharged in the direction opposite to the direction in which the keyhole extends. As a result of having conducted various experiments, the inventors of the disclosure have found that the plume discharged from the keyhole formed in the inclined surface is discharged in the direction that is vertical or approximately vertical to the flat plane in which the opening of this keyhole is formed.

In the present embodiment, peak light PL3 is higher in laser intensity than peak light PL2. As a result, the amount of the plume discharged through the opening of keyhole 82 formed by peak light PL3 is greater than the amount of the plume discharged through keyhole 81. Also, the rate of the plume discharged through keyhole 82 is higher than the rate of the plume discharged through keyhole 81.

Furthermore, the plume discharged from the molten pool formed in inclined surface 56 is also discharged in the direction that is vertical or approximately vertical to inclined surface 56. Inclined surface 56 is inclined downward from upper surface 55 toward outer peripheral surface 54. Accordingly, the plume discharged from inclined surface 56 moves in the direction away from case body 50 also in the horizontal direction as this plume rises.

As the plume discharged from inclined surface 56 moves in this way, the plumes discharged from upper surface 63 and upper surface 55 are also dragged by the plume discharged from inclined surface 56.

As a result of observing plume 85 discharged from the irradiation position of laser light L and its surrounding area, it is found that plume 85 is discharged in the direction inclined from the direction that is perpendicular to upper surface 63 and upper surface 55. Specifically, a discharge direction 86 of plume 85 corresponds to a direction that is away from case body 50 and cover body 61 in the horizontal direction as this plume 85 moves from upper surface 55 upward in the vertical direction.

Therefore, as shown in FIG. 12, since plume 85 is inclined in the direction away from insulator 22, plume 85 can be suppressed from exerting a thermal effect upon insulator 22 during application of laser light L.

In this case, as shown in FIG. 7, intersecting angle θ is set to be 15 degrees or more and 45 degrees or less.

When intersecting angle θ is smaller than 15 degrees, the inclination angle of discharge direction 86 shown in FIG. 14 or the like is also smaller. Thus, plume 85 may move closer to insulator 22 when plume 85 shakes.

If intersecting angle θ is larger than 45 degrees, the incident angle of laser light L upon inclined surface 56 becomes larger when laser light L is applied from above. Accordingly, laser light L reflected from inclined surface 56 is increased. As a result, the energy entering inclined surface 56 is reduced, so that a molten pool required for welding is less likely to be formed, which may lead to welding failures.

Also in FIG. 7, when width W2 is smaller than 0.1 mm, the melting amount in case body 50 becomes insufficient. Particularly when upper surface 55 of case body 50 is located lower than upper surface 63 of cover body 61 due to uneven dimensions and the like of case body 50 and cover body 61, the joint strength between case body 50 and cover body 61 or the airtightness inside the case may not be able to be ensured.

Furthermore, when width W2 is larger than (width W1—0.1 mm), the area of inclined surface 56 is reduced, so that plume 85 shown in FIG. 12 is less inclined. As a result, when shaking of plume 85 occurs, this plume 85 may exert a thermal effect upon insulator 22.

Furthermore, the power density of each of peak light PL1, peak light PL2 and peak light PL3 is set to be relatively high, for example, set to be equal to or greater than 1E+07 (W/cm$^2$). Accordingly, shaking of the formed plume 85 can be suppressed.

In FIG. 14, in region R1 to region R6, metal that forms cover body 61 and case body 50 melts and then solidifies, thereby forming weld portion 7.

In this case, peak light PL2 is located at the center of laser light L while peak light PL1 is higher in laser intensity than peak light PL2 and peak light PL3. Accordingly, the temperature distribution within cover body 61 and case body 50 is lopsided toward peak light PL1.

Specifically, the lowermost portions in regions R3, R4, R5, and R6 are located closer to the irradiation position of peak light PL1 than to the irradiation position of peak light PL2. The lowermost ends of regions R3, R4, R5, and R6 are located in the vicinity of facing surface 33.

Accordingly, as shown in FIG. 4, vertex portion 44 of weld portion 7 formed by solidification of the molten pool is to be located at facing surface 33 or in the vicinity thereof.

Furthermore, in the horizontal direction, the distance between the irradiation position of peak light PL1 and facing surface 33 is shorter than the distance between the irradiation position of peak light PL2 and facing surface 33. Furthermore, in the horizontal direction, the distance between the irradiation position of peak light PL1 and facing surface 33 is shorter than the distance between the irradiation position of peak light PL3 and facing surface 33.

Accordingly, the distance between the end of the molten pool on the cover body 61 side and facing surface 33 is shorter than the distance between the end of the molten pool on the case body 50 side and facing surface 33. Consequently, as shown in FIG. 4, inner peripheral edge 40 is formed at the position closer to facing surface 33 than outer peripheral edge 41.

Cover body 61 is greater in heat capacity than case body 50 while peak light PL1 is higher in laser intensity than peak light PL2 and peak light PL3. Accordingly, a sufficient molten pool can be formed also on upper surface 63. If the laser intensity of peak light PL1 is low, the molten pool formed on upper surface 63 is small, which results in a reduced width of weld portion 7. Then, the molten pool starts to solidify when laser light L passes therethrough.

In this case, since cover body 61 is greater in heat capacity than case body 50, the heat of the molten pool produced in upper surface 63 is diffused into cover body 61 in an early stage. Accordingly, solidification of the molten pool formed in cover body 61 starts before solidification of the molten pool formed in case body 50.

When the molten pool solidifies, it drags the molten metal located therearound. Accordingly, the molten metal formed on inclined surface 56 is pulled toward cover body 61. Thus, as shown in FIG. 4, curved surface 47 of weld portion 7 can be suppressed from bulging from outer peripheral surface 36 to the outside.

When laser light L is applied, the laser intensity of peak light PL1 is high, so that a large quantity of molten metal is produced at the position where peak light PL1 is applied. When a molten pool containing a large quantity of molten metal solidifies, this molten pool drags a large quantity of molten metal located therearound. Accordingly, as shown in FIG. 4, vertex portion 45 of weld portion 7 is formed at a position close to inner peripheral edge 40 relative to the center of weld portion 7 in the width direction.

Figure 15:
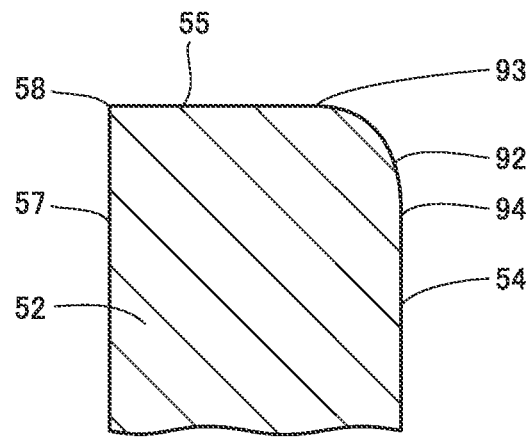
FIG. 15 is a cross-sectional view showing a modification of a case body 50A.

As described above, in the example shown in FIG. 14 and the like, peak light PL3 is applied to inclined surface 56, but the surface to which peak light PL3 is applied does not have to be inclined like inclined surface 56. FIG. 15 is a cross-sectional view showing a modification of a case body 50A. As shown in FIG. 15, case body 50A includes an upper surface 55, an outer peripheral surface 54, and a curved surface 92 that connects upper surface 55 and outer peripheral surface 54. In addition, an inflection point 93 is located at the boundary portion between upper surface 55 and curved surface 92 while an inflection point 94 is located at the boundary portion between outer peripheral surface 54 and curved surface 92.

Then, curved surface 92 is formed so as to extend downward from inflection point 93 toward inflection point 94 and also extend away from cover body 61. Peak light PL3 may be applied to such curved surface 92 of case body 50A.

As described above, when welding process P3 is completed, introducing process P4 is performed as shown in FIG. 6. Specifically, an electrolyte solution is introduced through inlet 12 in FIG. 1.

Then, as shown in FIG. 7, sealing process P5 is performed. Specifically, sealing member 13 is formed at inlet 12. In this way, secondary battery 1 shown in FIG. 1 can be manufactured.

Although the method of manufacturing a lithium ion battery and the lithium ion battery have been described in the above-described embodiment, the disclosure is also applicable, for example, to a lithium-polymer battery and the like.

In other words, the disclosure is applicable to a secondary battery including a electrode body and a battery case housing the electrode body, and preferably applicable to a sealed battery.

EXAMPLES

Figure 16:
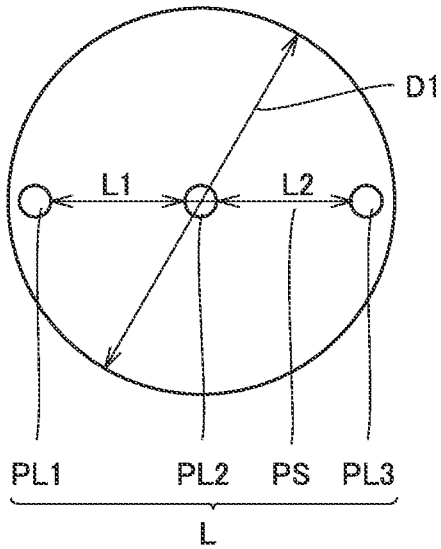
FIG. 16 is a schematic diagram showing a pattern 1 of the irradiation pattern of laser light L.
Figure 17:
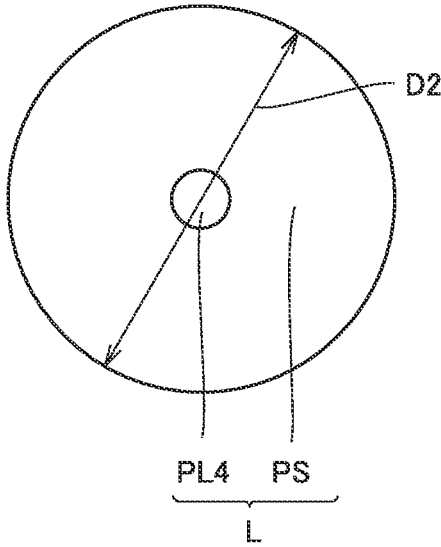
FIG. 17 is a schematic diagram showing a pattern 2 of the irradiation pattern of laser light L.

The following table shows the results obtained by conducting experiments while variously changing the welding conditions. In the following Table 1, "θ" indicates an intersecting angle θ shown in FIG. 7; and "Pattern 1" of "Laser Intensity" indicates a beam pattern shown in FIG. 16. In FIG. 16, ambient light PS has a diameter D1 of 0.45 mm, and distances L1 and L2 each are 0.2 mm. "Pattern 2" indicates a beam pattern shown in FIG. 17. In this beam pattern, laser light L includes ambient light PS and peak light PL4 that is located at the center of this ambient light PS.

Ambient light PS has a diameter D1 of 0.45 mm, and peak light PL3 has a diameter of 80 μm. In Pattern 2, the power ratio between ambient light PS and peak light PL4 is 1:1.

In Table 1, "Power Ratio" indicates the power ratio among peak light PL1, peak light PL2, and peak light PL3. The "laser Output" indicates a laser output of laser light L.

"Processing Speed" in Table 1 indicates the movement speed of the irradiation position of laser light L, and is indicated in the unit of (m/min).

In each of Examples 1 to 6 and Comparative Examples 1 to 16, ten battery cases 3 are formed under their respective welding conditions.

In Table 1, "Proportion of Defects 1" shows a proportion of battery cases 3 having weld portion 7 with an insufficient welding width. "Proportion of Defects 2" shows a proportion of battery cases 3 having insulator 22 undergoing burning and scorching, which have been found by observing insulator 22 after welding.

In "Determination" column in Table 1, when "Proportion of Defects 1" is "0/10" and "Proportion of Defects 2" is "0/10", a circle mark is placed. When the conditions for a circle mark are not satisfied, a cross mark is placed.

the irradiation pattern of laser light L is "pattern 2", welding failures occur and insulator 22 undergoes a thermal effect.

Although the embodiments of the disclosure have been described as above, it should be understood that the embodiments disclosed herein are illustrative and non-restrictive in every respect. The scope of the disclosure is defined by the terms of the claims, and is intended to include any modifications within the scope and meaning equivalent to the terms of the claims.

TABLE 1

| Examples | θ | Laser Intensity Pattern | Laser Intensity Power Ratio | Processing Speed | Laser Output (W) | Proportion of Defects 1 | Proportion of Defects 2 | Determination |
|---|---|---|---|---|---|---|---|---|
| Example 1 | 30° | Pattern 1 | 1.2:0.8:1 | 9 | 1200 | 0/10 | 0/10 | ○ |
| Example 2 | 30° | Pattern 1 | 1.2:0.8:1 | 24 | 1800 | 0/10 | 0/10 | ○ |
| Comparative Example 1 | 0° | Pattern 2 | | 9 | 1200 | 0/10 | 5/10 | x |
| Comparative Example 2 | 0° | Pattern 2 | | 24 | 1800 | 1/10 | 2/10 | x |
| Comparative Example 3 | 0° | Pattern 1 | 1.2:0.8:1 | 9 | 1200 | 0/10 | 4/10 | x |
| Comparative Example 4 | 0° | Pattern 1 | 1.2:0.8:1 | 24 | 1800 | 0/10 | 3/10 | x |
| Comparative Example 5 | 30° | Pattern 2 | | 9 | 1200 | 0/10 | 3/10 | x |
| Comparative Example 6 | 30° | Pattern 2 | | 24 | 1800 | 2/10 | 2/10 | x |
| Example 3 | 15° | Pattern 1 | 1.2:0.8:1 | 9 | 1200 | 0/10 | 0/10 | ○ |
| Example 4 | 15° | Pattern 1 | 1.2:0.8:1 | 24 | 1800 | 0/10 | 0/10 | ○ |
| Example 5 | 45° | Pattern 1 | 1.2:0.8:1 | 9 | 1200 | 0/10 | 0/10 | ○ |
| Example 6 | 45° | Pattern 1 | 1.2:0.8:1 | 24 | 1800 | 0/10 | 0/10 | ○ |
| Comparative Example 7 | 50° | Pattern 1 | 1.2:0.8:1 | 9 | 1200 | 0/10 | 2/10 | x |
| Comparative Example 8 | 50° | Pattern 1 | 1.2:0.8:1 | 24 | 1800 | 0/10 | 1/10 | x |
| Comparative Example 9 | 30° | Pattern 1 | 0.8:1.2:1 | 9 | 1200 | 3/10 | 3/10 | x |
| Comparative Example 10 | 30° | Pattern 1 | 0.8:1.2:1 | 24 | 1800 | 5/10 | 5/10 | x |
| Comparative Example 11 | 30° | Pattern 1 | 1:1.2:0.8 | 9 | 1200 | 2/10 | 2/10 | x |
| Comparative Example 12 | 30° | Pattern 1 | 1:1.2:0.8 | 24 | 1800 | 3/10 | 3/10 | x |
| Comparative Example 13 | 30° | Pattern 1 | 1:0.8:1.2 | 9 | 1200 | 1/10 | 1/10 | x |
| Comparative Example 14 | 30° | Pattern 1 | 1:0.8:1.2 | 24 | 1800 | 1/10 | 1/10 | x |
| Comparative Example 15 | 30° | Pattern 1 | 0.8:1:1.2 | 9 | 1200 | 4/10 | 4/10 | x |
| Comparative Example 16 | 30° | Pattern 1 | 0.8:1:1.2 | 24 | 1800 | 7/10 | 7/10 | x |

As apparent from Examples 1, 2, 3, 4, 5 and 6, and Comparative Examples 3 and 4, it turns out that when intersecting angle θ becomes smaller than 15 degrees, a plume exerts a thermal effect upon insulator 22.

As apparent from Examples 1 to 6 and Comparative Examples 7 and 8, it turns out that when intersecting angle θ is larger than 45 degrees, insulator 22 undergoes a thermal effect.

Furthermore, as apparent from Examples 1 and 2, and Comparative Examples 9 to 16, it turns out that, even if intersecting angle θ is 30 degrees and the irradiation pattern of laser light L is "pattern 1", but if the power ratio among peak light PL1, peak light PL2 and peak light PL3 does not establish the relation of "peak light PL1>peak light PL3>peak light PL2", insulator 22 undergoes a thermal effect, and welding failures occur.

Also as apparent from Comparative Examples 1 and 2, it turns out that when intersecting angle θ is 0 degree and when

What is claimed is:

1. A method of manufacturing a secondary battery, the method comprising:

preparing a case body provided with an opening, wherein the case body includes: a bottom plate portion and a peripheral wall portion that is connected to an outer peripheral edge of the bottom plate portion, the peripheral wall portion standing upright, the peripheral wall portion including an outer peripheral surface, an inner peripheral surface, an upper surface annularly extending so as to provide the opening, a connecting surface connecting the outer peripheral surface and the upper peripheral surface, wherein the connecting surface extends downward from the upper surface to the outer peripheral surface, and wherein the upper surface and the inner peripheral surface form an opening edge at the opening;

disposing a cover body in the opening, wherein the cover body includes: an upper surface and an outer peripheral edge, wherein the cover body is disposed in the opening of the case body so that the outer peripheral edge of the cover body faces the opening edge of the case body; and applying laser light from above the cover body and the case body, onto the opening edge of the case body and the outer peripheral edge of the cover body to weld the outer peripheral edge of the cover body and the opening edge of the case body, wherein the applying the laser light includes applying a first peak light to a first irradiation position located on the upper surface of the cover body, applying a second peak light to a second irradiation position located on the upper surface of the peripheral wall between the first irradiation position and the connecting surface, and applying a third peak light to a third irradiation position located on the connecting surface, the first peak light being higher in intensity than the second peak light and the third peak light, and the third peak light being higher in intensity than the second peak light.

2. The method of manufacturing a secondary battery according to claim 1, wherein the connecting surface is an inclined surface, and the inclined surface is inclined at an angle of 15 degrees or more and 45 degrees or less with respect to a virtual flat plane along a virtual line extending linearly from the upper surface of the case body to an outside of the case body.

\* \* \* \* \*